United States Patent [19]

Golick

[11] 4,205,940
[45] Jun. 3, 1980

[54] APPARATUS FOR REMOTELY REPAIRING TUBES IN A STEAM GENERATOR

[75] Inventor: Leonard R. Golick, Penn Township, Allegheny County, Pa.

[73] Assignee: Westinghouse Electric Corp., Pittsburgh, Pa.

[21] Appl. No.: 888,701

[22] Filed: Mar. 21, 1978

[51] Int. Cl.² .................................................. B65G 47/90
[52] U.S. Cl. ................................ 414/728; 29/402.01; 165/76; 414/729; 414/743; 414/744 R
[58] Field of Search ................. 214/1 R, 1 H, 147 T, 214/1 BC, 1 BD, 151, 147 G, 147 R, 1 B, 130 R, 1 CM, 1 SW, 1 BB, 146.5, 1 BT, 130 A, 1 BH, 140, 149, 1 BV; 29/401; 165/76; 414/728, 732–735, 743, 738–741, 744, 729

[56] References Cited

U.S. PATENT DOCUMENTS

| 3,236,397 | 2/1966 | Lakin | 214/1 H |
| 3,740,820 | 6/1973 | Tarves, Jr. | 29/401 |
| 3,913,752 | 10/1975 | Ward et al. | 214/1 BB |
| 3,934,731 | 1/1976 | Müller et al. | 214/1 BB |

FOREIGN PATENT DOCUMENTS 965727  4/1975  Canada ................................... 214/1 H Primary Examiner—Frank E. Werner
Attorney, Agent, or Firm—F. J. Baehr, Jr.

[57] ABSTRACT

Apparatus that is assembled quickly inside a portion of a channel head of a steam generator and is capable of performing various repair and inspection operations on all of the tubes and the tubesheet in that portion of the channel head.

10 Claims, 6 Drawing Figures

APPARATUS FOR REMOTELY REPAIRING TUBES IN A STEAM GENERATOR

BACKGROUND OF THE INVENTION

1. Field of the Invention

This invention relates to nuclear steam generators and more particularly to apparatus for remotely repairing the tubes and tubesheet in a nuclear steam generator.

In pressurized water nuclear reactors primary fluid or coolant is pumped through a reactor and a steam generator, radioactive contaminants in the primary fluid are deposited on the tubes and in the channel head of the steam generator so that repair crews are subjected to significant radioactivity when working within the channel head. Therefore, in order to reduce the exposure of personnel to radiation, it is desirable to provide an apparatus which can be remotely operated and effectively inspect and repair the tubes and tubesheets within the steam generator.

2. Description of the Prior Art

Patent application Ser. No. 775,676, filed Mar. 8, 1977, and patent application Ser. No. 873,292, filed Jan. 30, 1978 show similar apparatus to that described in this invention, however, the previous apparatus could not operate on every tube in the portion of the head that contains the apparatus. While such apparatus was acceptable for normal repair work within the head when the apparatus is to be used in a retubing operation, it is necessary that the apparatus be able to perform operations on each and every tube within that portion of the head.

SUMMARY OF THE INVENTION

Apparatus for remotely repairing a tubesheet and tubes disposed in a portion of a head of a steam generator, which has a centrally disposed partition, which divides the head into an inlet portion and an outlet portion and has a manway disposed in each of said portions, when made in accordance with this invention, comprises a column rotatably disposed in the head generally perpendicular to the tubesheet, the column having one end terminating a predetermined distance from the tubesheet, the top end of column fastened to the divider plate through a pillow block arrangement, the bottom end of the column resting in a spherical bearing block. The apparatus also comprises a boom pivotally mounted adjacent the terminal end of the column by means of a tapered hex and flanged nut, a device for rotating the column and the beam therewith, and a device for locking the column and boom in any rotated position. The apparatus further comprises hydraulic cylinders for pivoting the boom from a position generally parallel to the tubesheet to a position generally aligned with the manway. A carriage is disposed to ride lengthwise along the boom and has a drive for moving the carriage lengthwise along the boom and affixes it at any position along the boom. The carriage is made up of a baseplate disposed generally parallel to the tubesheet when the longitudinal axis of the boom is generally parallel to the tubesheet, a platform disposed generally parallel to the baseplate and a drive and guide system for moving the platform and maintaining parallelism between the baseplate and the platform. An air motor is affixed to the platform and a cantilevered tool holder is attached to the platform and is driven by the air motor. The tool holder has a chuck disposed on the distal end of the cantilevered portion. The chuck will accept a plurality of tools operable on the tubes and tubesheet, whereby the apparatus can perform operations on one-half of the tubesheet and all of the tubes disposed in that half of the tubesheet.

BRIEF DESCRIPTION OF THE DRAWINGS

The objects and advantages of this invention will become more apparent from reading the following detail description in connection with the accompanying drawings, in which.

DESCRIPTION OF THE PREFERRED EMBODIMENT

Figure 1:
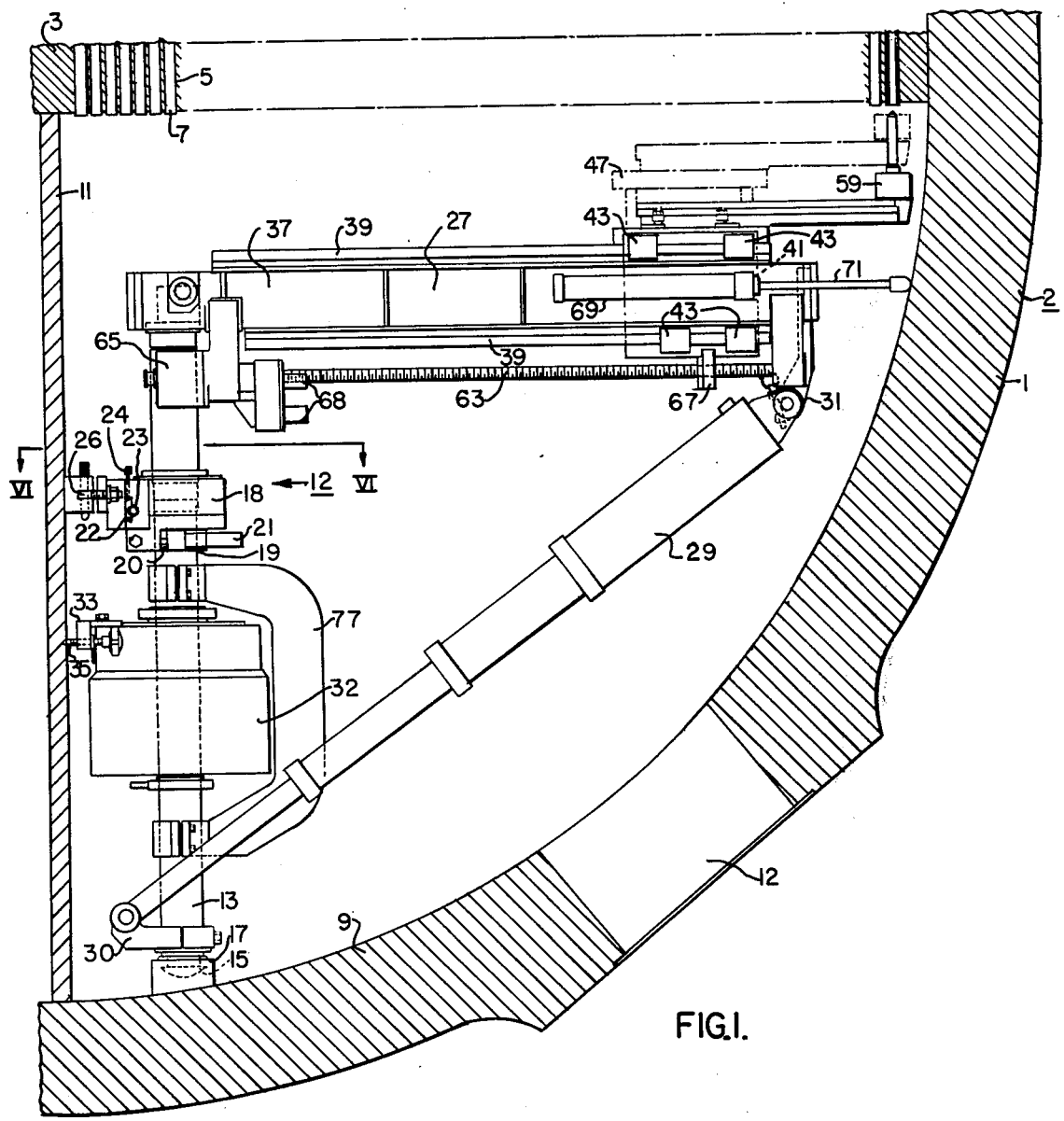
FIG. 1 is a partial sectional view of a head of a steam generator with apparatus for remotely repairing the tubes and tubesheets made in accordance with this invention disposed therein.
Figure 2:
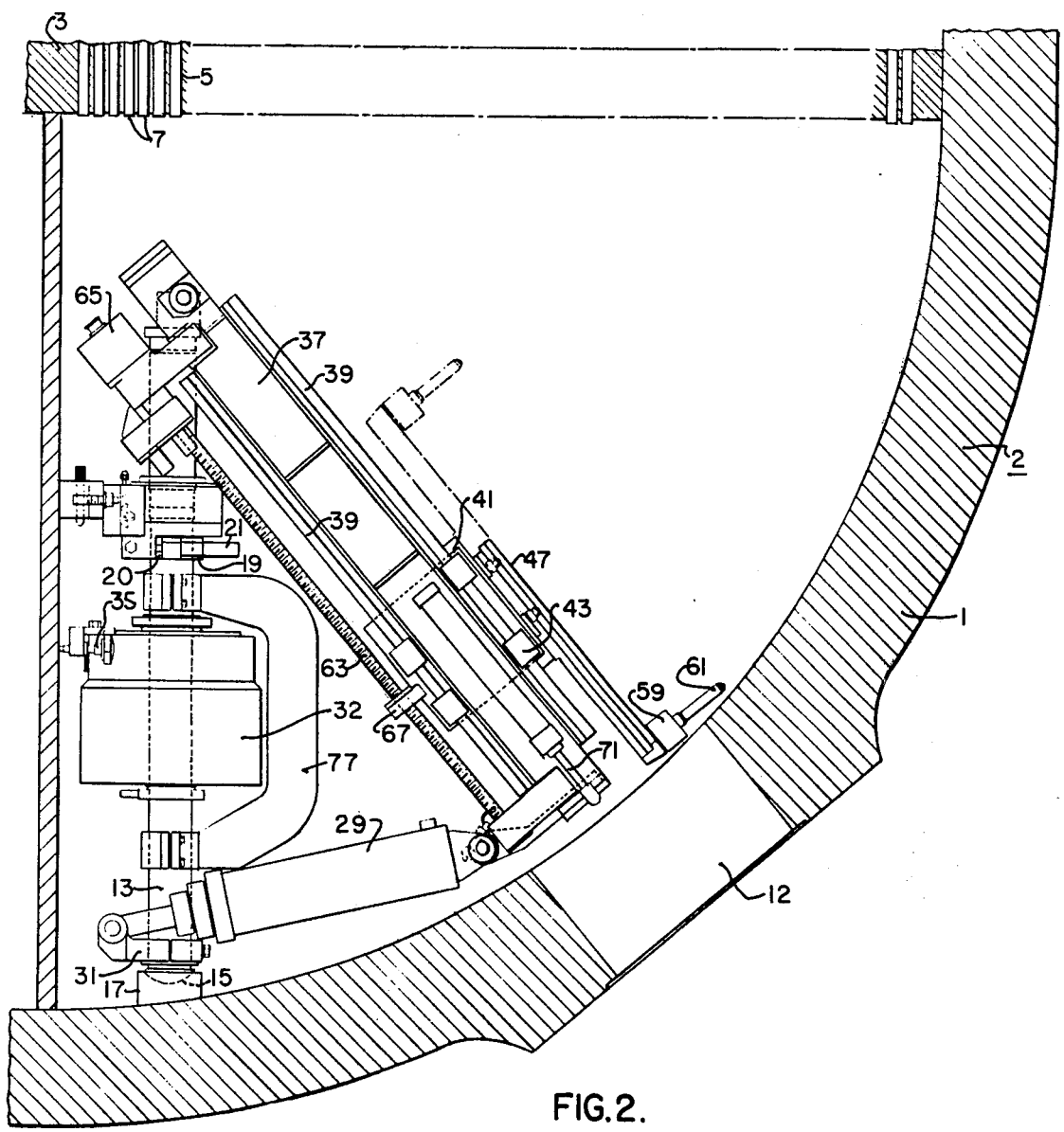
FIG. 2 is a partial sectional view of a head of a steam generator with the apparatus in a different position.

Referring now to the drawings in detail and in particular to FIGS. 1 and 2 there is shown a portion of a channel head 1 of a steam generator 2 having a tubesheet 3 with a plurality of holes 5 disposed therein. Tubes 7 are disposed in the holes 5 and extend upwardly from the tubesheet 3. The channel head 1 has generally hemispherical walls 9 and is divided into an inlet portion and an outlet portion (only one of which is shown in the drawings) by a dividing plate 11. Each portion has a manway 12 disposed in the wall 9.

Apparatus for remotely repairing and inspecting the tubes 7 and tubesheet 3 is disposed in one portion of the channel head 1 and comprises a vertically oriented column 13 which is pivotally connected to the wall 9 of the channel head 1 and extends generally upwardly therefrom. The column 13 is generally perpendicular to the tubesheet 3 and disposed adjacent the dividing plate 11. A spherical bearing block, which contains tapered roller bearing 15 is disposed at the foot of the column 13 in a spherical housing 17, which is fastened to the wall 9 by welding or other means and forms a first support means for the column 13. A second support means 18 is fastened to the dividing plate 11 by welding or other means and is disposed adjacent the intermediate portion of the column 13. The column 13 is rotatably disposed within the second support means 18 by an antifriction bearing such as ball or roller bearings (not shown). The second support means 18 also has a split collar 19 disposed thereon. The split collar 19 has a gap 20, which is closed by a hydraulic cylinder 21 to lock the column 13 in any of its rotated positions.

Figure 6:
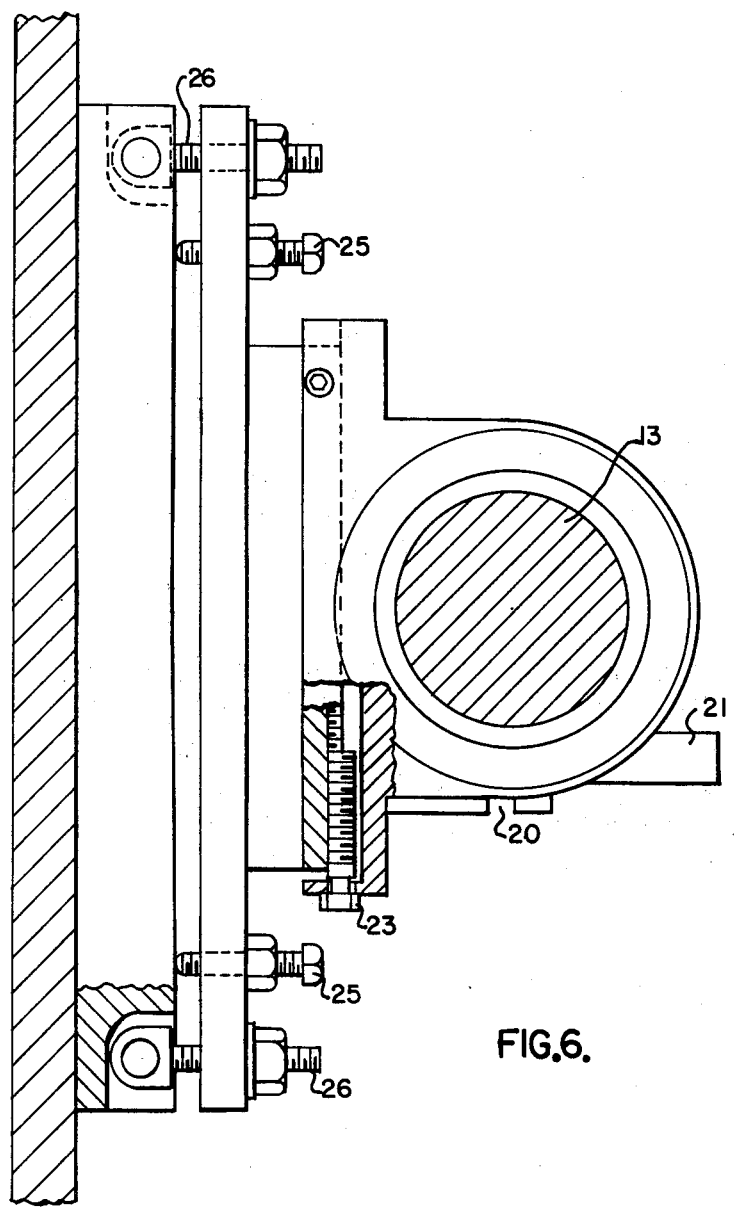
FIG. 6 is a sectional view taken on line VI—VI of FIG. 1.

As shown in FIGS. 1 and 6 the second support 18 has X and Y adjustments in a plane generally parallel to the tubesheet for aligning the column generally perpendicular to the tubesheet 3. One degree of movement, X, is afforded by a dovetail 22 and adjusting screw 23. A set screw 24 locks the dovetail 22 in position when the column is plum in one direction. The other degree of movement, Y, is provided by jackscrews 25 and clevis mounted bolts 26, or other means, such as shims.

The terminal or upper end of the column 13 terminates a predetermined distance from the tubesheet 3.

A boom 27 is pivotally connected to the terminal or upper end of the column 13 by a suitable mounting bracket 28. The pivotal connection is such that the boom 27 rotates with the column 13 and can pivot from a position generally parallel to the tubesheet 3 to a position generally aligned with the manway 12. A pair of telescoping hydraulic cylinders 29 (only one is shown) are pivotally connected to the lower end of the column 13 by a suitable bracket 30 and to the distal end of the boom 27 by another bracket 31 to provide means for pivoting the boom 27 from a positon generally parallel to the tubesheet 3 to a position generally aligned with the manway 12.

A hollow shaft DC motor 32 is disposed over the column 13 and is connected thereto. The motor 32 has a base 33 with adjustable feet 35, which engage the dividing plate 11 to provide means for rotating the column 13 and the boom 27 therewith. Disposed within the motor are rotary induction means for indicating the angular position of the hollow shaft and a tachometer for speed control. The motor 32 is reversible so that it can rotate the column 13 and boom 27 in either direction.

The boom 27 comprises a pair of generally parallel rails or channels 37 with ways 39 on the top and bottom portion of each channel 37. The ways 39 extend longitudinally along the boom and are parallel to each other. A carriage 41 is slidably disposed on the ways 39. The carriage 41 has four bearings 43, which slidably engage the ways 39 so that the carriage moves rectilinearly and parallel to the longitudinal axis of the boom 27.

Figure 3:
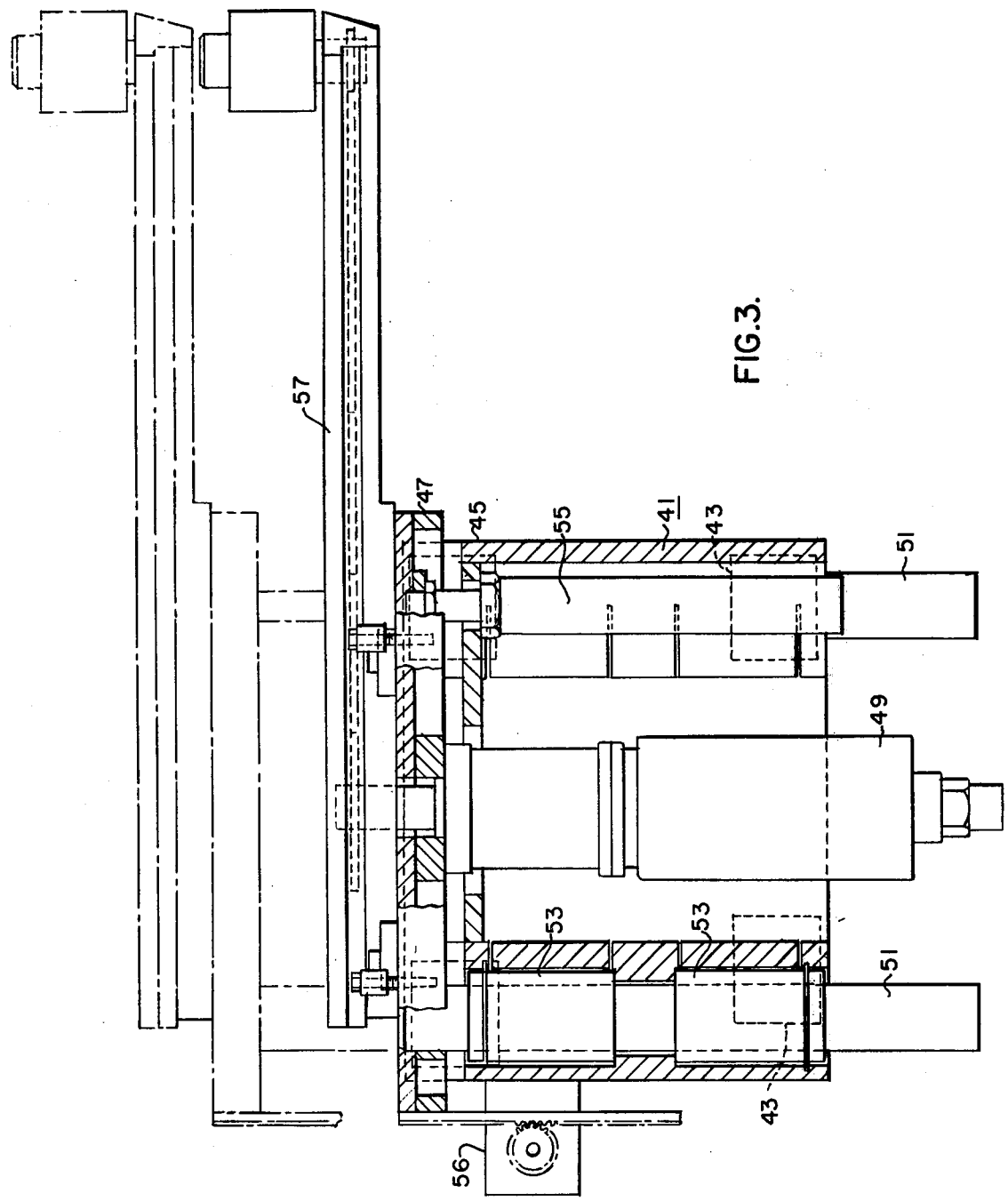
FIG. 3 is a partial sectional view of a carriage and tool holder utilized in this invention.
Figure 4:
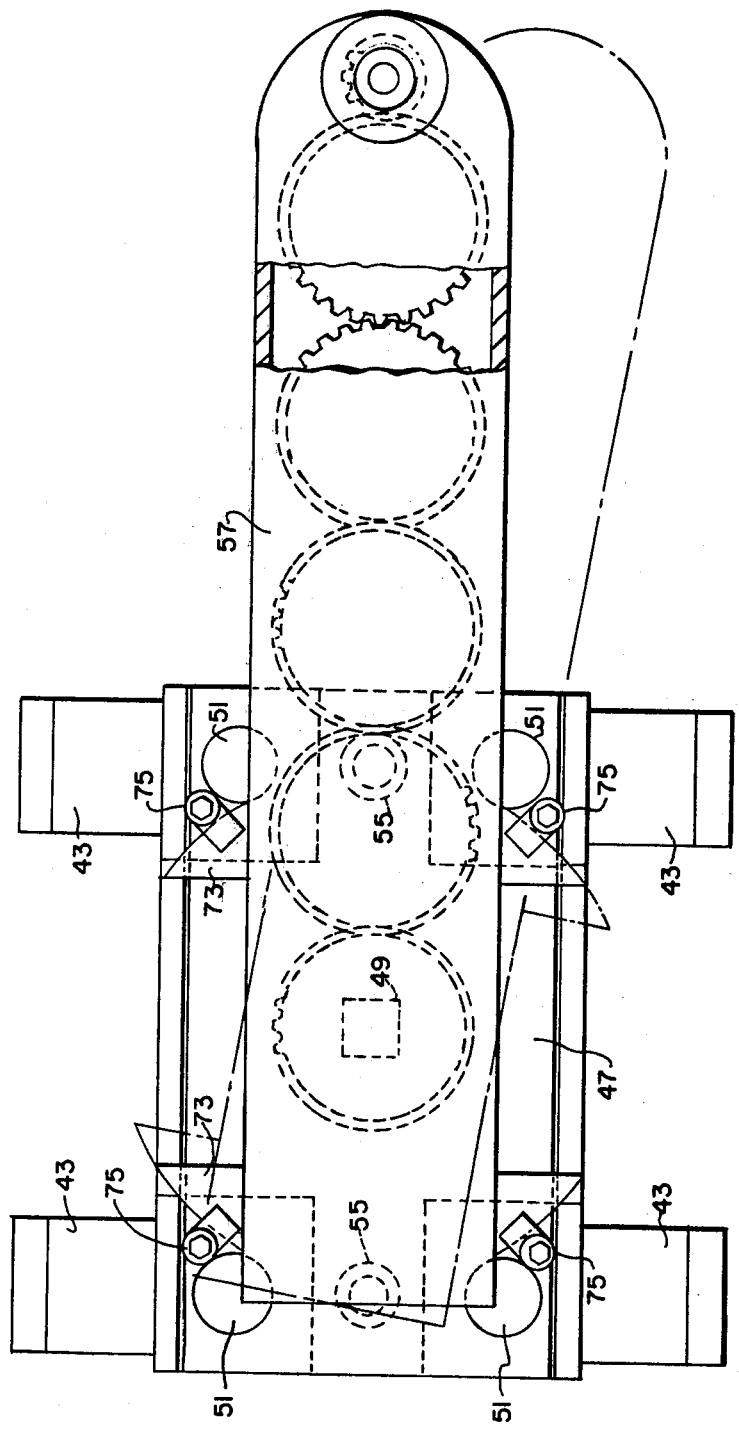
FIG. 4 is a partial sectional view of the carriage and tool holder.

The carriage 41, as shown best in FIGS. 3 and 4, comprises a baseplate 45 and a platform 47 disposed generally parallel to each other and generally parallel to the tubesheet 3, when the longitudinal axis of the boom 27 is parallel thereto. The baseplate 45 is connected to the bearings 43 and the platform 47 is disposed above and parallel to the baseplate 45. An air motor 49 or other drive means is connected to the platform 47.

Means for guiding the platform 47 with respect to the baseplate 45 and for maintaining parallelism therebetween comprises four round bars 51, which are affixed adjacent the four corners of the platform 47, eight ball bushings 53 disposed in the baseplate 45 for slidably receiving the bars 51, and a pair of double acting hydraulic cylinders 55 connected to the baseplate 45 and the platform 47. Means for indicating the speed and position of the platform 47 with respect to the baseplate 45 is shown generally at 56.

A cantilevered tool holder 57 is fastened to the platform 47 and coupled to the drive motor 49. The cantilevered tool holder has a tool receptacle or chuck 59 on the distal end thereof for holding a tool and a train of gears other drive means 62 connects the drive motor 49 to the tool chuck 59 providing power to drive the tool 61.

Referring back to FIGS. 1 and 2, a ball screw 63, drive motor 65 and ball nut 67 are cooperatively associated with the boom 27 and carriage 41 to provide means for moving the carriage rectilinearly along the boom 27 and for holding the carriage 41 at any position along the boom 27. The ball screw 63 extends the length of the boom 27 and is disposed generally parallel to the longitudinal axis thereof. The ball nut 67 is affixed to the carriage 41 and engages the threads on the screw 63.

Resolvers 68 are provided for indicating the position of the carriage along the boom.

Disposed on the boom 27 are a pair of hydraulic cylinders 69 which have piston rods 71 that can be extended outwardly to contact the wall 9 of the head 1 to steady the boom 27 when the tool 61 is performing an operation on the tubes 7 or tubesheet 3.

The cantilevered tool holder 57, as shown best in FIG. 4, has arcuate plates 73 equally spaced on opposite sides of the axis of the drive motor 49. Lugs 75 clamp the arcuate plates 73 and tool holder 57 to the platform 47. Locating pins and bushings (not shown) are provided in the arcuate plate and in the platform so that the cantilevered tool holder can be aligned with the axis of the boom as shown in FIG. 1, rotated 180° as shown in FIG. 2 or rotated to form an acute angle with respect to the axis of the boom as shown in FIG. 4 or any other position desired. The varying positions of the tool holder and short column 13 cooperate to provide access to all of the tubes in one-half of the tubesheet and establish accurate positioning of the tool holder to allow remotely-controlled-repeated operation on any tube in that half of the tubesheet.

A C-shaped stiffening bracket 77 is fastened to the column 13 spanning the motor 32 in order to reduce the deflection in the column 13.

Figure 5:
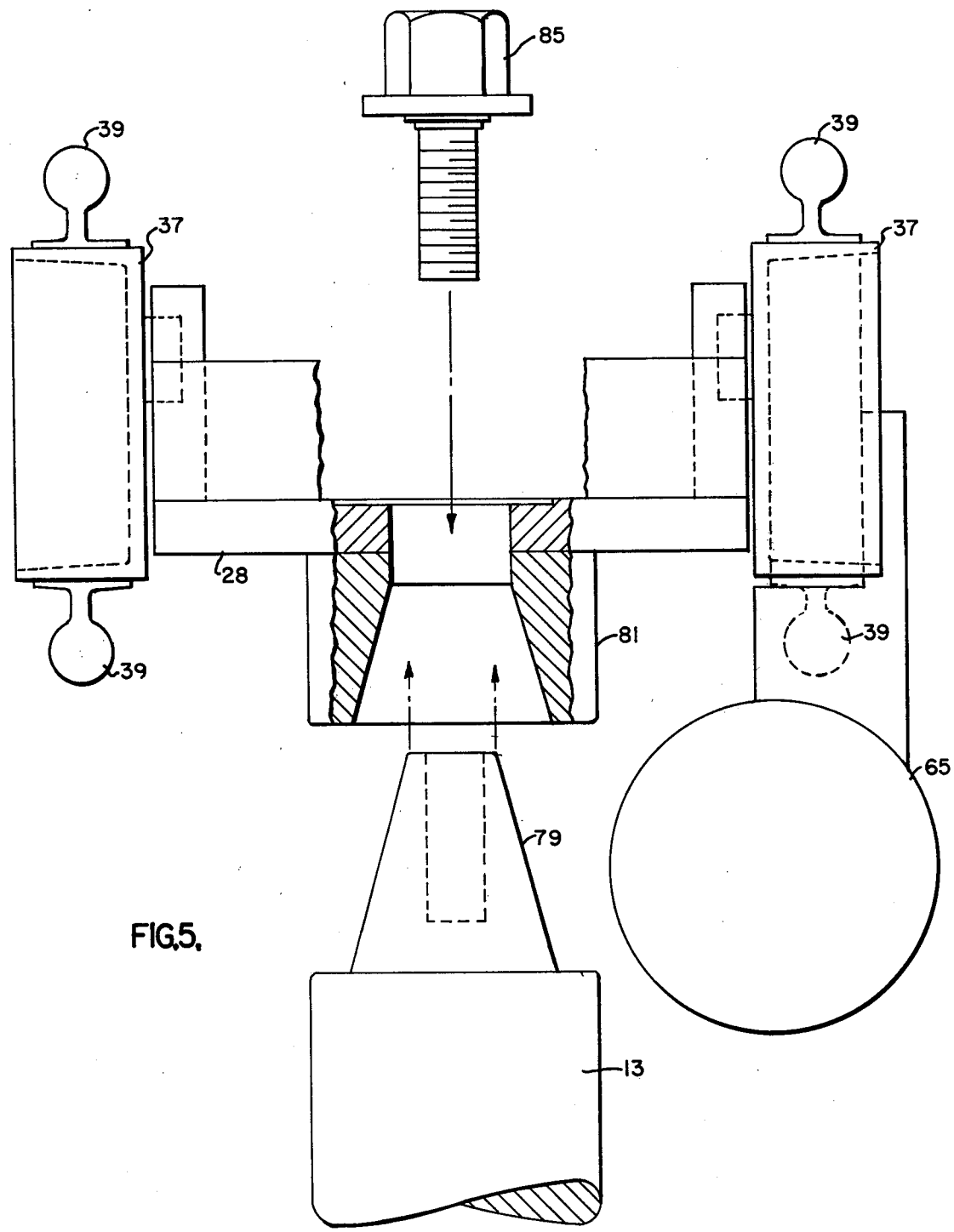
FIG. 5 is an exploded view partially in section showing the attachment of a boom to a column.

As shown in FIG. 5 the upper or terminal end of the column 13 has a taper 79 machined thereon. The mounting bracket 28 has a collar 81 disposed thereon. The collar 81 has a taper 83 counterbored therein so that the tapers 77 and 83 engage to provide a fit which will transmit torque from the column 13 to the boom 27 without relative movement therebetween. A capscrew 85 or some other type of fastener is provided to bring the tapers 77 and 83 into engagement and insure the proper fit to allow the boom 27 to rotate with the column 13 and be removable from the column 13.

Hydraulic cylinders 69 are disposed on the boom 27 and have a piston rod 71, which when extended contacts the wall 9 to help support and steady the distal end of the boom 27.

The apparatus hereinbefore described may be easily and quickly installed inside the channel head of a steam generator and with an assortment of tools can perform various operations on all of the tubes in one-half of the tubesheet. The apparatus so structured is rugged and reliable so that it can operate within the close tolerances necessary to retube a steam generator utilizing remote controls. To operate remotely, the angular position of the boom and column must be repeatable. Accurate angular positioning and indicating the angular position of the column and the boom is provided by the motor and positioning package 32 and once the column and boom are positioned in the desired angular position the split collar 19 locks the column 23 in that position.

The carriage 41 is positioned by rotating the ball screw and the motor has a brake disposed therein to maintain the screw in any desired position. The preloaded nut which rides on the threads of the screw has a plurality of balls which engage the threads. This combination minimizes any backlash allowing very accurate positioning of the carriage. This combination is not subject to be backdriven by the carriage, therefore with the drive motor brake engaged, the carriage remains in a fixed position.

The hydraulic cylinders, which raise the boom 27 from a position aligned with the manway 12 to a position where the boom 27 is generally parallel to the tubesheet 3, preferably are fully extended, when in the latter position, to increase the rigidity of the apparatus.

What is claimed is:

1. Apparatus for remotely repairing a tubesheet and tubes accessible from a head of a steam generator, which has a centrally disposed partition dividing the head into an inlet and an outlet portion and a manway disposed in each of said portions, said apparatus comprising a column rotatably disposed in a portion of said head generally perpendicular to said tubesheet, said column having one end terminating a predetermined distance from said tubesheet;

a boom pivotally mounted adjacent the terminal end of said column;

means for rotating said column and said boom therewith;

means for locking said column and said boom in any rotated position;

means for pivoting said boom from a position generally parallel to said tubesheet to a position generally aligned with said manway;

a carriage disposed to ride lengthwise along said boom;

means for moving said carriage lengthwise along said boom and for fixing the position of said carriage on said boom;

said carriage having a baseplate generally parallel to the tubesheet when the longitudinal axis of the boom is generally parallel to the tubesheet, a platform generally parallel to the baseplate, means for moving said platform and maintaining the parallelism with said baseplate, a drive motor associated therewith, and a tool holder cantilevered over the edge of said carriage;

said tool holder having a chuck for holding a tool driven by said drive motor;

said tool holder accepting a plurality of tools operable on the tubes and the tubesheet and having means cooperatively associated therewith, so that it may be affixed at a plurality of overhanging positions with respect to the carriage, whereby the apparatus can perform operations on one-half of the tubesheet and all of the tubes disposed in said half of the tubesheet.

2. The apparatus as set forth in claim 1, wherein the cantilevered tool holder has means disposed therein for transmitting power from the drive motor to the tool chuck.

3. Apparatus as set forth in claim 2, wherein the means for transmitting power from the drive motor to the tool chuck comprises a gear train.

4. Apparatus as set forth in claim 1, wherein the means for rotating said column is a hollow shaft motor.

5. Apparatus as set forth in claim 1, wherein the means for locking said column comprises a split collar with a gap at the split and a hydraulic cylinder, which when activated closes the gap and clamps the column.

6. Apparatus as set forth in claim 1, wherein the boom has four ways disposed thereon generally parallel to the longitudinal axis of the boom and the carriage has bearings which slidably engage the ways.

7. Apparatus as set forth in claim 1, wherein the means for moving the platform and maintaining parallelism with the baseplate comprises a plurality of bars disposed perpendicular to said platform, a plurality of bearings slidably engaging said bars and attached to said baseplate, and at least one hydraulic cylinder connected to said baseplate and said platform, which when activated moves the platform with respect to the baseplate.

8. Apparatus as set forth in claim 1 and further comprising a support rotatably disposed on an intermediate portion of the column.

9. Apparatus as set forth in claim 8 wherein the intermediate support has disposed therein means adjustable in two directions in a plane generally parallel to the tubesheet.

10. Apparatus as set forth in claim 1 and further comprising a pivotable support fastened to the lower end of the column and to the head.

* * * * *